United States Patent [19]

Feld

[11] 4,401,017
[45] Aug. 30, 1983

[54] STEAMER POT ASSEMBLY

[75] Inventor: Gerald M. Feld, Van Nuys, Calif.

[73] Assignee: Trend Products Company, Van Nuys, Calif.

[21] Appl. No.: 398,751

[22] Filed: Jul. 14, 1982

[51] Int. Cl.³ .............................................. A47J 27/04
[52] U.S. Cl. ..................................... 99/413; 126/369
[58] Field of Search ............... 99/410, 413, 414, 416, 99/417, 411, 412, 450; 126/369; 134/135

[56] References Cited

U.S. PATENT DOCUMENTS

| | | | |
|---|---|---|---|
| 545,770 | 9/1895 | Bowen et al. | 99/413 X |
| 629,127 | 7/1899 | Geer | 99/414 X |
| 639,474 | 12/1899 | Welty | 99/413 |
| 812,590 | 2/1906 | Obermann | 126/369 |
| 1,004,423 | 9/1911 | Hanlon | 99/413 X |
| 1,241,002 | 9/1917 | Neuens | 99/413 |
| 1,276,749 | 8/1918 | George | 99/412 |
| 1,394,612 | 10/1921 | Dernell | 99/414 |
| 1,949,561 | 3/1934 | De Camp | 99/418 |
| 2,112,990 | 4/1938 | Hunter | 99/413 X |
| 3,489,075 | 1/1970 | O'Reilly | 99/450 |
| 4,106,486 | 8/1978 | Lee | 126/369 |

*Primary Examiner*—Billy J. Wilhite
*Attorney, Agent, or Firm*—Irvin A. Lavine

[57] ABSTRACT

A steamer pot assembly includes a pot, a steamer basket and a lid. The pot has a lip bounded by an upstanding flange at its upper end. The steamer basket is perforated and fits within the pot; it has a lip which rests on the pot lip. The steamer basket has two bails, each having two ends pivotally connected to the basket, each end being spaced from the adjacent end of the other bail a short distance. Each bail has two arcuate legs, connected by an inverted U-shaped connector portion which rests on the basket lip, inwardly of the outer edge thereof, leaving a space between it and the flange of the pot to receive the lower edge of the lid.

11 Claims, 4 Drawing Figures

STEAMER POT ASSEMBLY

BACKGROUND OF THE INVENTION

The present invention relates to a steamer pot assembly for cooking food through use of steam.

The popularity of cooking foods by steaming them has risen markedly in the past few years. A widely used cooking utensil is the steamer insert, which is usually supplied as a separate article, and which has a bottom with a number of overlapping leaves which are pivoted to the bottom, and which may be moved from a collapsed position in which they overlie the bottom, to an extended position, in which they extend outwardly from the bottom; both the leaves and the bottom are perforated to permit the passage of steam therethrough, and this steamer insert is provided with legs so as to support the bottom of it above the bottom of the cooking pot into which it is placed. These steamer inserts found their widest application in the cooking of vegetables, and were of relatively small capacity, the bottom typically having a diameter of just under six inches, with a wall height of approximately two and one-half inches, when the leaves forming the wall were placed substantially perpendicular to the bottom. Thus, these steamer baskets of the interleaved configuration had an inherent limitation on the capacity thereof since the folded position limited the height of the leaves forming the walls to slightly less than the radius of the bottom.

There are known, in the prior art, various constructions of steamer pot assemblies. Welty U.S. Pat. No. 639,474 discloses an apparatus for steaming food, including a pot having a thickened lip, a lid having an out-turned lip for resting on the lip of the pot, and a steamer basket having a lower portion of wire netting and an upper section of sheet steel, with feet on the bottom to support the bottom of the basket above the bottom of the pot. The steamer basket has a bail having ends extending through apertures in the sheet metal rim, the bail having an arcuate intermediate portion, the uppermost portion of the bail apparently resting against the inner wall of the upper section. Such construction, while capable of being made in a relatively large size and therefore having a sufficient volume for holding food, has a lack of stability due to the fact that only a single bail was used. In addition, the steamer basket required feet to support the bottom of it above the bottom of the pot, leading to greater difficulty in cleaning. In this construction, also, there was no cooperation between the lid and the steamer basket, or the bail forming a part of it.

Hunter U.S. Pat. No. 2,112,990 provides a steamer basket having a lower section of wire mesh, and an upper metal section, to which a pair of bails are attached, the ends of the bails being comparatively close together, and the bails, in the collapsed condition, extending over the bottom of the steamer basket, which rests on the bottom of the pot for boiling of the food carried in the steamer basket. For steaming, the bails are used to support the basket, by being placed on the rim of the pot, there being no disclosure of a lid.

Neuens U.S. Pat. No. 1,241,002 provides a device useful in canning, including a perforated tray for holding jars to be immersed in a boiler, the tray being provided with a pair of handles pivoted to it, the handles being configured so as to hook over the edge of the boiler pot.

The prior art failed to provide a steamer pot assembly of a construction so as to enable it to be of relatively large volume, wherein a bail arrangement was provided giving stability for lifting the steamer basket, which provided for holding the bails in position where they were both out of the food in the steamer basket, readily accessible and enabled the lid to rest on a flange of the steamer basket, outwardly of and guided by the bails.

SUMMARY OF THE INVENTION

A steamer pot assembly is provided which includes a pot, a steamer basket and a lid. The steamer basket is slightly smaller than the pot, and has an out-turned lip which rests on an out-turned lip of the pot, thereby supporting the steamer basket. The steamer basket is provided with a pair of bails, each having an end which extends through a perforation of the steamer basket located just below the out-turned lip thereof. Extending from each end is an outwardly bowed arcuate portion, the two arcuate portions being connected by an intermediate connector portion of inverted U-shape, which latter rests upon the out-turned lip of the steamer basket, slightly inwardly of an up-turned flange of the pot. The lid has a thickness which is related to the space between the U-shaped connector portion, and the up-turned flange of the pot, so that its lower edge may be placed in the space between the connector portion of each of the bails and the up-turned flange of the pot, the connector portions serving partially as guides for placement of the lid in position. The pot and steamer basket are cylindrical, and the ends of the two bails are spaced apart along the cylindrical wall of the steamer basket at least approximately 14°, the ends of each bail being less than 180° apart.

Among the objects of the present invention are to provide a steamer pot assembly of suitable capacity, which is relatively easy to clean, has bails positioned for stability of carrying, has a bail construction which permits the bails to rest on the steamer basket and not on the food, to provide a bail construction in which the bail is easily grasped, and to provide a bail construction which cooperates with the basket and the lid, so as to provide a guide for the lid when being placed onto the pot and steamer basket.

DESCRIPTION OF THE PREFERRED EMBODIMENT

Figure 1:
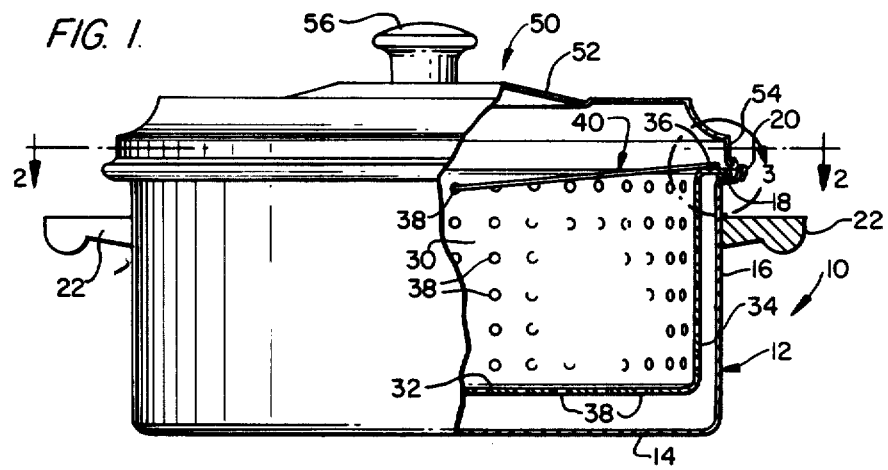
FIG. 1 is an elevational view, partly in section, of a steamer pot assembly in accordance with the present invention.

Referring now to the drawings, wherein like or corresponding reference numerals are used to designate like or corresponding parts throughout the several views, there is shown in FIG. 1 a steamer pot assembly 10 which includes a pot 12 having a bottom 14 and a cylindrical wall 16 extending upwardly therefrom, the wall 16 having at its upper end an out-turned lip 18, with a surrounding, upstanding flange 20. Handles 22 are attached to the wall 16.

A steamer basket 30 is provided within pot 12, having a bottom 32 which is of lesser diameter than the bottom 14 of the pot 12. The steamer basket 30 also has a cylindrical wall 34 extending upwardly from the bottom 32, wall 34 at its upper end having an out-turned lip 36 which rests on the lip 18 of the pot 12. Both the bottom 32 and wall 34 of the steamer basket 30 are provided with perforations 38, so as to permit the passage of steam therethrough from water contained within the pot 12. A bail 40 may be seen in FIG. 1 resting on the lip 36 of the steamer pot 30. In addition, there is provided a lid 50 which includes a cover portion 52, and having a generally vertically extending lower edge 54, and having in addition, a handle 56.

Figure 2:
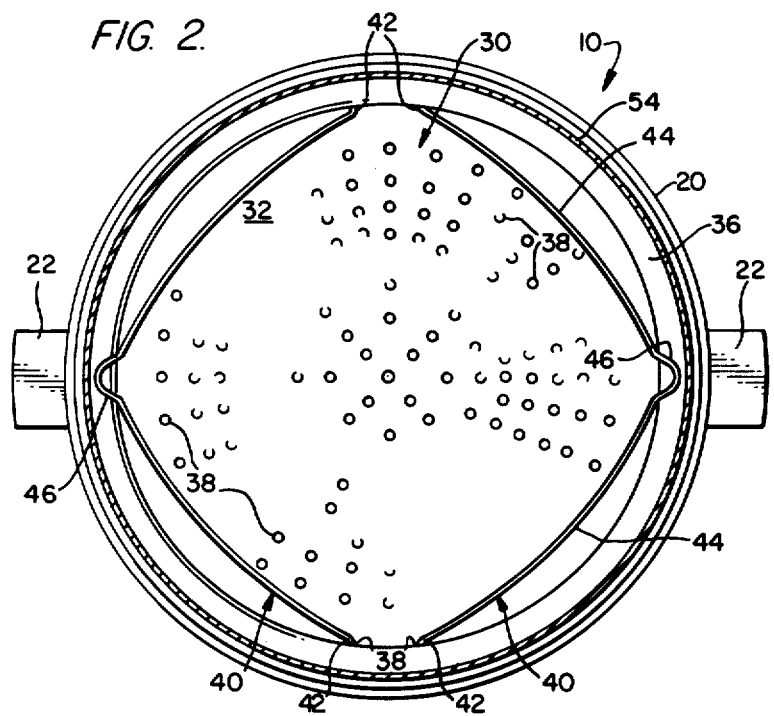
FIG. 2 is a cross-sectional view taken on the line 2—2 of FIG. 1.

Referring now to FIG. 2, there may be seen the flange 20 of the pot 12, inwardly thereof and adjacent thereto there being as shown in cross-section the lower edge of the lid 50. There may also be seen the bottom 32 of the steamer pot 30 with perforations 38 therein and the out-turned lip 36.

Each of the bails 40 has a generally horizontal end 42 extending through a perforation 38 in the wall 34 which is closely adjacent to the lip 36 (see also FIG. 1). Connected to each of the ends 42 is an outwardly bowed arcuate portion 44, and an inverted U-shaped intermediate portion 46 is provided, which connects the arcuate portions 44 and which rests upon the out-turned lip 36. In a preferred embodiment, by way of example, the steamer basket may have an internal diameter of approximately 9½ inches, and may have a height of the cylindrical wall 34 of 3¼ inches. The end 42 of one of the bails 40 is spaced from the end 42 of the other bail 40 a distance of approximately 1⅛ inches, so that there is approximately 14° of arc between end portions 42 of the two bails 40. In addition, the end portions 42 of each of the bails 40 are spaced from each other less than 180°.

Figure 3:
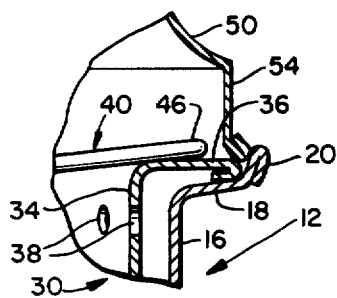
FIG. 3 is an enlarged cross-sectional view of the structure within the circle designated 3 on FIG. 1.

Referring now to FIG. 3, there is shown a portion of the wall 16 of the pot 12, the out-turned lip 18 thereof, and the upstanding flange 20, which may be seen to be in the form of a rolled bead. The wall 34 of the steamer basket 30 may be seen in inwardly spaced relationship to the wall 16 of the pot 12, and there may also be seen the out-turned lip 36, having a bead or rolled edge, the lip 36 resting on the lip 18. The lower edge 54 of the lip 50 may have a rolled edge or bead, and will be seen to be in the space between the connector portion 46 of the bail 40, and the up-turned flange 20 of the pot 12. Thus, the bail 40 not only rests upon the flange 36, and is thereby kept from falling into the food within the steamer basket 30, but the bail 40 provides a guiding arrangement for the positioning of lid 50, guiding it, in conjunction with the flange 20, into position where it rests upon the out-turned lip 36 of the steamer basket 30. The arcuate portions 44 are spaced from the lip 36, to permit them to be readily grasped, and raised.

Figure 4:
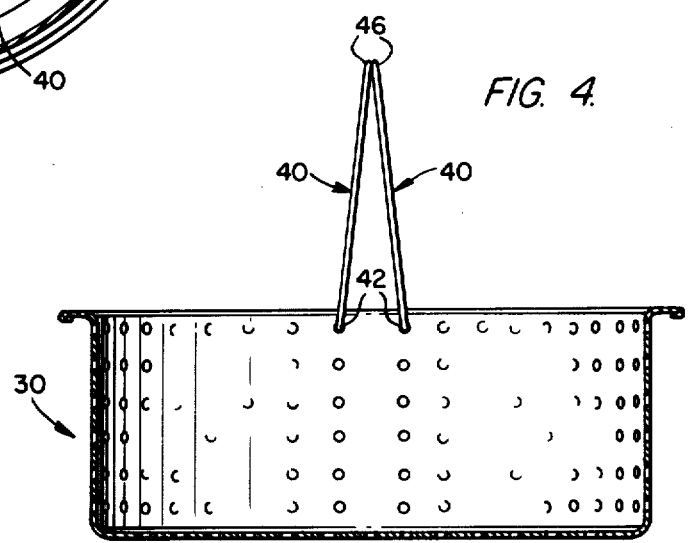
FIG. 4 is an elevational view of the steamer basket, with the bails in lifting position.

FIG. 4 shows the steamer basket 30, with the bails 40 in position for raising or lowering the steamer basket. The intermediate, inverted U-shaped portions 46 of the bails are closely adjacent to each other, and are on the central axis of steamer basket 30. The ends 42 are spaced apart, and this construction gives stability should the basket strike an object while being moved, since it will not be permitted to rotate about a single axis.

There has been provided a steamer pot assembly of suitable volumetric capacity, and including the provision of a construction of bails providing for stability of the steamer basket. This stability is particularly useful should, during movement, the basket strike an object, such as an edge of the table, which would thereby tend to tilt the basket. Further, there has been provided herein a steamer pot assembly in which not only is a steamer basket supported by an out-turned lip on a lip of a pot, but, in addition, a bail or bails is provided in which an intermediate portion thereof is enabled to rest or be supported on the out-turned lip of the steamer basket, so as to support the bail in position to be readily grasped, and to enable the bail to be held in a position out of contact with the food in the steamer basket. In addition, the construction of the bail is such as to serve as a guide for the lid, in conjunction with an up-turned flange on the pot.

It will be obvious to those skilled in the art that various changes may be made without departure from the spirit of the invention, and therefore the invention is not limited to that shown in the drawings described in the specification but only as indicated in the appended claims.

I claim:

1. A steamer pot assembly comprising:
   (a) a pot having a bottom, and a wall extending therefrom and having at its upper end an out-turned lip and a surrounding upstanding flange,
   (b) a perforated steamer basket within said pot and having a bottom, spaced from the bottom of the pot, a wall spaced from the wall of the pot and having at its upper end and out-turned lip resting on the lip of the pot,
   (c) bail means comprising at least one bail having two ends pivotally secured to the wall of the steamer basket adjacent the upper end thereof and having an intermediate portion thereof resting on the lip of the steamer basket, and
   (d) a lid having a lower edge adapted to rest on one of said lips.

2. The steamer pot assembly of claim 1, wherein said bail means comprises two said bails.

3. The steamer pot assembly of claim 2, wherein each of the ends of one of the bails is spaced a short distance from an end of the other of said bails.

4. The steamer pot assembly of claim 3, said steamer basket being cylindrical, the ends of each said bail are circumferentially spaced less than 180°.

5. A steamer pot assembly of claim 3 or 4, wherein there is at least approximately 14° of arc between the end of one bail and the closest end of the other bail, along the wall of said steamer basket.

6. The steamer pot assembly according to claim 1, said bail means comprising at least one bail having a pair of arcuate legs extending from each of said ends thereof, the intermediate portion being in the form of an inverted U-shaped connector portion.

7. The steamer pot assembly according to claim 6, where there are two such bails.

8. The steamer pot assembly according to claim 7, wherein each of said U-shaped connector portions is spaced inwardly of the flange of said pot, there being a space between each said U-shaped connecting portion and the flange of the pot.

9. The steamer pot assembly according to claim 8, wherein said space is at least as large as the thickness of the lid lower edge.

10. The steamer pot assembly comprising:
   (a) a pot having a bottom and a cylindrical wall, said wall having at the upper end thereof removed from said bottom an out-turned lip, there being an upstanding, surrounding flange on said lip, (b) a perforated steamer basket having a bottom of lesser diameter than the bottom of said pot, and having a cylindrical wall extending upwardly from said bottom, said wall having at its upper end an out-turned lip resting on the lip of the pot, the bottom of the steamer basket and the wall of the steamer basket being spaced, respectively, from the bottom and wall of the pot, (c) a pair of bails pivotally connected to said steamer basket, each comprising a generally horizontal end extending through a perforation of said steamer basket lying closely adjacent the out-turned lip thereof, an outwardly bowed, arcuate portion extending from each said end, said arcuate portions being connected by an intermediate connector portion of inverted U-shape, said intermediate connector portion of each bail resting on the out-turned lip of said steamer basket, said connector portions lying inwardly of the surrounding flange of said pot, and providing a radial space therebetween, (d) a lid having a lower edge resting on the lip of the steamer basket, and between the intermediate portions of said bails and said surrounding flange of said pot.

11. The steamer pot assembly of claim 10, wherein said bails each extends across less than 180° of the circumference of the steamer basket, and wherein adjacent ends of the bails are spaced apart at least approximately 14° of the circumference of the steamer basket.

* * * * *